(12) United States Patent
May

(10) Patent No.: US 7,917,706 B1
(45) Date of Patent: Mar. 29, 2011

(54) SDRAM CONTROLLER

(75) Inventor: Roger May, Bicester (GB)

(73) Assignee: Altera Corporation, San Jose, CA (US)

( * ) Notice: Subject to any disclaimer, the term of this patent is extended or adjusted under 35 U.S.C. 154(b) by 181 days.

(21) Appl. No.: 10/737,645

(22) Filed: Dec. 15, 2003

(51) Int. Cl.
*G06F 13/00* (2006.01)
*G06F 13/36* (2006.01)

(52) U.S. Cl. ......... 711/151; 711/158; 710/113; 710/309

(58) Field of Classification Search .................. 711/151
See application file for complete search history.

(56) References Cited

U.S. PATENT DOCUMENTS

| | | | |
|---|---|---|---|
| 5,334,952 A * | 8/1994 | Maddy et al. ................. | 331/1 A |
| 6,092,158 A * | 7/2000 | Harriman et al. ............. | 711/151 |
| 6,209,067 B1 * | 3/2001 | Collins et al. ................ | 711/158 |
| 6,286,083 B1 * | 9/2001 | Chin et al. .................... | 711/151 |
| 6,321,284 B1 * | 11/2001 | Shinohara et al. ............ | 710/113 |
| 6,438,635 B1 * | 8/2002 | Date et al. ..................... | 710/113 |
| 6,519,666 B1 * | 2/2003 | Azevedo et al. .............. | 710/120 |
| 6,684,302 B2 * | 1/2004 | Kershaw ....................... | 711/151 |
| 6,816,947 B1 * | 11/2004 | Huffman ....................... | 711/151 |
| 6,990,541 B2 * | 1/2006 | Clayton ......................... | 710/244 |
| 7,020,741 B1 * | 3/2006 | Tischler ......................... | 711/106 |
| 2001/0010066 A1 * | 7/2001 | Chin et al. ..................... | 711/108 |
| 2003/0093630 A1 * | 5/2003 | Richard et al. ................ | 711/154 |
| 2004/0210694 A1 * | 10/2004 | Shenderovich ................ | 710/113 |

OTHER PUBLICATIONS

ARM, PrimeCell MultiPort Memory Controller (PL172) Technical Reference Manual, 2002, pp. 16 as found on www.armsemi.com/pdfs/DDI0215D_mpmc_pl172_r2p3_trm.pdf on Mar. 29, 2006.*

* cited by examiner

*Primary Examiner* — Kevin L Ellis
*Assistant Examiner* — Matthew Bradley
(74) *Attorney, Agent, or Firm* — Ropes & Gray LLP

(57) ABSTRACT

A SDRAM controller prioritizes memory access requests to maximize efficient use of the bandwidth of the memory data bus, and also gives different priorities to access requests received on its different inputs. The SDRAM controller has multiple inputs, at least one of which allows connections to multiple bus master devices. The SDRAM controller forms a queue of bus access requests, based amongst other things on a relative priority given to the input on which a request is received. When a request is received on an input which allows connections to multiple bus master devices, the SDRAM controller forms the queue of bus access requests, based amongst other things on a relative priority given to the bus master device which made the request.

16 Claims, 2 Drawing Sheets

SDRAM CONTROLLER

TECHNICAL FIELD OF THE INVENTION

This invention relates to a memory controller, and in particular to a controller for a SDRAM (Synchronous Dynamic Random Access Memory) device, and to a method of operation of a memory controller.

BACKGROUND OF THE INVENTION

Computer systems must be provided with sufficient data storage capacity to operate correctly. This data storage capacity is typically provided as Random Access Memory (RAM), and SDRAM is a common form of RAM.

A SDRAM memory chip is divided into banks of memory, and each bank is subdivided into pages. Typically, it is only possible to have one page open in each bank of the chip. When data is to be written to, or read from, a page of the chip which is not open, it is necessary to open that page before the required memory access can be performed. If possible, it is therefore more efficient to perform a series of memory accesses in a single page in succession, before closing that page, opening another page, and then performing a series of memory accesses in that other page in succession.

Accesses to the SDRAM chip are performed by a SDRAM controller, which typically takes the form of a separate, integrated circuit. The SDRAM controller is connected to the SDRAM by means of a memory data bus, and the SDRAM controller must operate as far as possible to maximize efficient use of the bandwidth of that bus.

One known SDRAM controller has multiple inputs, for receiving access requests from different system components. The SDRAM controller then has an arbiter, for prioritizing requests received on the different inputs, and forming a queue of SDRAM commands. The queue of SDRAM commands can then be processed in an order which maximizes efficient use of the bandwidth of the memory data bus, as described above, by grouping in series those access requests which relate to an open page of the SDRAM. Alternatively, the queue of SDRAM commands can then be processed in an order which gives priority to requests received on one or more specific inputs.

SUMMARY OF THE INVENTION

While prioritizing access requests to maximize efficient use of the bandwidth of the memory data bus, the arbiter of the SDRAM controller according to the present invention also gives different priorities to access requests received from different masters which may be connected to one of the different inputs of the device.

More specifically, according to a first aspect of the present invention, a memory controller has multiple inputs, at least one of which allows connections to multiple bus master devices. The memory controller forms a queue of bus access requests, based amongst other things on a relative priority given to the input on which a request is received. When a request is received on an input which allows connections to multiple bus master devices, the memory controller forms the queue of bus access requests, based amongst other things on a relative priority given to the bus master device which made the request.

The memory controller of the present invention therefore distinguishes between access requests received from the different bus master devices connected to one input interface, when prioritizing the received access requests to form the queue of access requests.

This has the advantage that the overall performance of the computer system is optimized since higher priority can be given to memory access requests received from devices whose performance is most critical to the overall performance.

The invention is described herein with specific reference to its use in a controller for a SDRAM (Synchronous Dynamic Random Access Memory) device, although the invention can also be applied to controllers for other memory types.

DETAILED DESCRIPTION OF PREFERRED EMBODIMENTS

Figure 1:
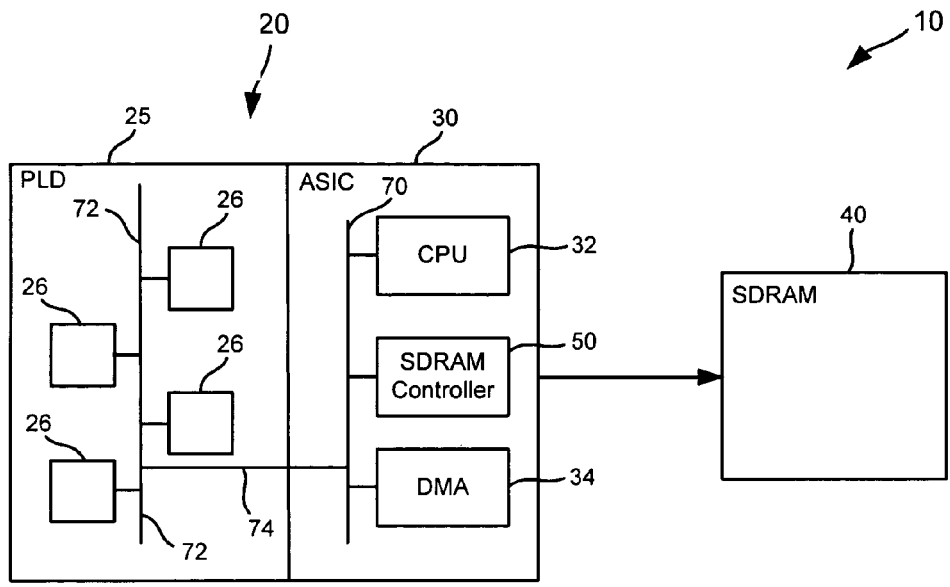
FIG. 1 is a block schematic diagram of a computer system in accordance with the present invention.

FIG. 1 is a block schematic diagram of a computer system 10. In this illustrated embodiment of the invention, the system 10 comprises a reconfigurable device 20 having an embedded processor and a separate Synchronous Dynamic Random Access Memory (SDRAM) device 40.

The general form of the system 10 is conventional, and will be described herein only to the extent necessary for a complete understanding of the present invention.

The reconfigurable device 20 is divided into two parts, namely a programmable logic device (PLD) 25 and an Application Specific Integrated Circuit (ASIC) 30. The PLD 25 is a Field Programmable Gate Array (FPGA) or similar, having a number of devices, which are programmable in a wide variety of ways, such that the PLD 25 performs a required function or set of functions. The PLD 25 may for example be programmed to provide specific functions for a particular application.

The ASIC 30 includes the embedded processor functionality. For example, the ASIC 30 in this illustrated embodiment includes a processor 32, in the form of a processor core, with associated cache memory and memory management unit, and a direct memory access controller (DMA) 34, amongst other things.

The main memory requirements of the system are however provided in the Synchronous Dynamic Random Access Memory (SDRAM) device 40. As is conventional, the SDRAM memory chip 40 is divided into banks of memory, and each bank is subdivided into pages.

Memory access requests from the device 20 are transferred to the SDRAM 40 by means of a SDRAM controller 50 within the ASIC part 30 of the device 20. The SDRAM controller 50 is connected to the SDRAM 40 by means of a memory bus 60. One function of the SDRAM controller 50 is to ensure that the bandwidth of the memory bus 60 is utilized as efficiently as possible.

The invention is also applicable to other devices, in which the memory controller is connected to the memory by means other than a dedicated memory bus.

The PLD 25 can contain multiple functional blocks 26 which can make separate memory access requests to the SDRAM 40.

The CPU 32, DMA 34 and SDRAM controller 50 are interconnected by a first bus 70. In the presently preferred embodiment of the invention, the first bus 70 is a 64-bit AHB bus, although other bus structures can also be used. The functional blocks 26 of the PLD 25 are interconnected by a second bus 72, which is also an AHB bus, although again other bus structures can be used. A bridge 74 connects the first bus 70 and the second bus 72. The bridge 74 allows the PLD part 25 of the device 20 to be clocked at a different frequency from the ASIC part 30. This has the advantage that the user can design the device such that the two parts each have an optimal clock rate.

Although FIG. 1 shows one bridge 74 between the PLD part 25 and the ASIC part 30 of the device 20, there may be multiple bridges, depending on how many interfaces are required between those two parts in a particular implementation. Each bridge will then connect a bus structure within the PLD part 25 with a bus structure within the ASIC part 30.

Figure 2:
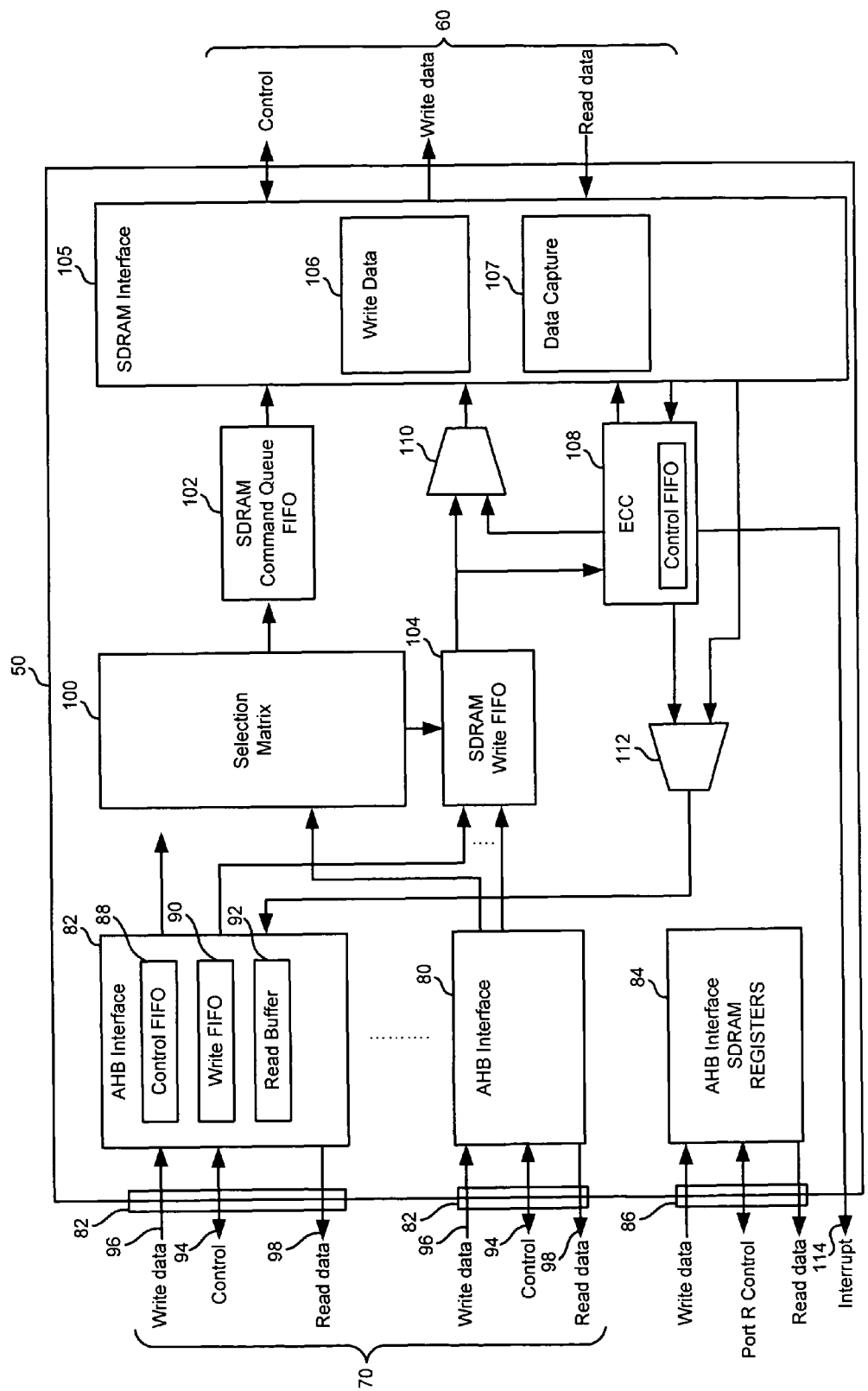
FIG. 2 is a block schematic diagram of a SDRAM controller in the computer system of FIG. 1.

FIG. 2 is a block schematic diagram, showing the form of the SDRAM controller 50.

The SDRAM controller 50 has a number of AHB slave interfaces 80, each of which is connected to a respective port 82 of the device. In the illustrated embodiment of the invention, there are five interfaces 80, although the SDRAM controller 50 may be provided with any convenient number of such interfaces. Each of the ports 82 can simultaneously receive AHB accesses, and allow access to the SDRAM 40 over the memory bus 60, as described in more detail below.

The SDRAM controller 50 has a further AHB slave interface 84, which is connected to a port 86 of the device. The port 86 allows access to the SDRAM controller registers only, for use in setting up the SDRAM controller 50. Thus, the SDRAM controller parameters can be initialised, and status information can be read back.

Each of the AHB slave interfaces 80 is of a type which is generally conventional and will therefore not be described in further detail. In this illustrated embodiment, each of the AHB slave interfaces 80 comprises a Control FIFO 88, for storing control information such as the address, access type and other information relating to each required SDRAM access, such as information relating to the status of the access, which can be passed back to the relevant master device. Each AHB slave interface 80 also comprises a Write FIFO 90 for storing data to be written to the SDRAM 40, and a Read Buffer 92 for storing data read from the SDRAM 40. Control information is written to and read from the Control FIFO 88 on a control line 94, data to be written to the SDRAM 40 is supplied to the Write FIFO 90 on a Write data line 96, and data read from the SDRAM 40 is supplied from the Read Buffer 92 on a Read data line 98.

It will be appreciated that the exact form of the AHB slave interface is not essential to the operation of the invention, and other implementations are also possible.

Each of the AHB slave interfaces 80 presents received AHB access requests to a Selection Matrix block 100, which acts as an arbiter between requests received from the AHB slave interfaces 80. As will be described in more detail below, the Selection Matrix block 100 selects one of the presented AHB access requests, and places it in a SDRAM Command Queue FIFO memory 102. The SDRAM Command Queue FIFO 102 can be configured to contain from one to four accesses.

Thus, in this illustrated embodiment of the invention, there is no reordering of received AHB access requests within the AHB slave interfaces 80, but the Selection Matrix 100 can reorder received AHB access requests, such that an access request received on one of the ports 82 can be placed in the SDRAM Command Queue FIFO 102 before an access request previously received on another of the ports 82.

Since there is no re-ordering of AHB access requests on any interface 80, there are no issues regarding data coherency on a per port basis. However, coherency issues could exist between masters connected to different AHB ports. Generally known techniques exist to overcome such problems. For example, when a first master writes data to the SDRAM controller, it can then initiate a read from the SDRAM controller. When the first master receives the data which it has written, it will be able to determine that the write data has indeed been written to the SDRAM, and it can then signal to a second master that it is safe for the second master to read the data from the SDRAM, without the risk that that data has not been updated.

If the access request selected by the Selection Matrix 100 is a Write operation, the data to be written is copied from the Write FIFO 90 of the relevant AHB slave interface 80 into a SDRAM Write FIFO 104, as well as the command being placed within the SDRAM. Command Queue FIFO 102.

Accesses placed in the SDRAM Command Queue FIFO 102 are processed in turn by a SDRAM Interface block 105, which initiates the required traffic on the memory bus 60.

The operation of the SDRAM Interface block 105, when it receives an access request, may be generally conventional, and so the SDRAM Interface block 105 will not be described further herein. However, for the purposes of explanation, it is mentioned that the SDRAM Interface block 105 includes a Write Data block 106 and a Data Capture block 107.

In this illustrated embodiment of the invention, error correction is performed, although this is not an essential feature of the invention. Therefore, in the case of a Write operation, the data to be written is passed from the SDRAM Write FIFO 104 to an error correcting code (ECC) block 108. Error correction code bits are generated by the ECC block 108 from each word in the write data, and are then combined with the write data in a multiplexer 110, before being passed to the Write Data block 106 of the SDRAM Interface block 105, and then to the separate memory device.

In the case of a Read operation, the data read from the SDRAM can be passed from the Data Capture block 107 in the SDRAM Interface block 106 to the optional error correcting code (ECC) block 108. As is well known, a suitable error correction mechanism can allow correction of (at least) single-bit errors in received data, and can detect the presence of multi-bit errors, even if it cannot correct such errors.

The read data, and any necessary error correction, are then combined in a'multiplexer 112, and the corrected data are passed to the Read buffer 92 in the relevant AHB interface 80, for transmission to the relevant bus master over the Read data line 98 and the bus 70.

In the preferred embodiment of the invention, the error correcting code that is used allows for correction of single bit errors, and allows for detection, but not correction, of double bit errors. If the error correcting code (ECC) block 108 detects the presence of a number of single bit errors which exceeds a predetermined threshold number, it generates an interrupt on line 114. If the error correcting code (ECC) block 108 detects the presence of an uncorrectable double bit error, it immediately generates an interrupt on line 114.

As mentioned above, the Selection Matrix block 100 acts as an arbiter between requests received from the different AHB interfaces 80. As also mentioned previously, the AHB interfaces 80 may be connected to individual bus masters, such as the processor 32 or the DMA 34 of the ASIC 30. However, one of the AHB interfaces 80 is connected to the bridge 74, and therefore may be connected to multiple bus masters, in the form of the multiple functional blocks 26.

Thus, in this illustrated embodiment of the invention, a situation arises in which one of the AHB interfaces 80 is connected to a bus, to which multiple bus masters are connected. More specifically, the multiple bus masters may be implemented within the fabric of a programmable logic device, and these bus masters may be interconnected by a bus, with this bus then having a single connection across the bridge 74 to one of the AHB interfaces 80.

When multiple bus masters are to be connected to an AHB interface 80, it is necessary for the bus to include a bus arbiter, while it is not necessary for the bus to include a bus arbiter if only one bus master is to be connected to it. The AHB interfaces 80 may be provided with, for example, different sized buffers, allowing them to be optimised for specific types of data traffic to be transferred therethough, based on the specific bus master to be connected thereto.

Although the invention has been described so far with reference to a situation in which multiple bus masters may be interconnected by a bus, with this bus then having a single connection across the bridge 74 to one of the AHB interfaces 80, a similar situation can arise in other ways, such that multiple bus masters may be connected to one or more of the AHB interfaces 80.

For example, the invention may be applied to devices in which there is no bridge between different parts of the device, and a bus supporting multiple masters, for example within a programmable logic device (PLD) or field programmable gate array (FPGA), may be connected directly to one or more of the AHB slave interfaces 80.

As another example, a single bus master can be configured so that it appears as multiple bus masters, allocating different priorities to different transactions. For example, where the bus master is a multi-channel direct memory access (DMA) controller, a stream to one specific data buffer may be given a higher priority that other streams. For example in a write operation if buffer is becoming full, it is advantageous if it can write data more quickly to ensure that the buffer does not overflow. Conversely, in a read operation if a buffer is becoming empty, it is advantageous if it can read data more quickly to ensure that the buffer still has sufficient data to service the respective peripheral device. References herein to "multiple bus masters" include a single bus master configured so that it appears as multiple bus masters.

According to the invention, when one of the multiple bus masters connected to a single AHB slave interface 80 makes an SDRAM access request, the access request includes data identifying the bus master making the request. The identifying data, also referred to herein as a master number, is then passed to the Selection Matrix 100. In other cases, when the AHB interface only has one device connected to it, data identifying the AHB interface is passed to the Selection Matrix 100.

When acting as an arbiter between requests received from the different AHB interfaces 80, the Selection Matrix block 100 then takes into consideration the data identifying the bus master making the request, as well as other parameters.

For example, it is preferable to use efficiently the bandwidth available for transferring data into and out of the SDRAM. As mentioned above, the SDRAM memory chip 40 is divided into banks of memory, and each bank is subdivided into pages. Typically, it is only possible to have one page open in each bank of the chip. When data is to be written to, or read from, a page of the device which is not open, it is necessary to open that page before the required memory access can be performed. If possible, the Selection Matrix block 100 therefore attempts to place access requests in the SDRAM Command Queue such that a series of memory accesses can be performed in a single page, before closing that page, opening another page, and then performing a series of memory accesses in that other page. For this purpose, the SDRAM controller 50 maintains a list of the open pages, and compares received access requests with this list.

Then, if an access request received by the Selection Matrix block 100 relates to an open page in the SDRAM, this access request can be given a higher priority, as regards placement in the SDRAM Command Queue.

Alternatively, if an access request received by the Selection Matrix block 100 relates to a page in the SDRAM which is closed, but which can be opened in the background because none of the access requests currently in the SDRAM Command Queue relate to this bank of the SDRAM, then this access request can be given a higher priority.

The present invention is however particularly concerned with the action of the Selection Matrix block 100 in prioritizing amongst received access requests, on the basis of information identifying the device making the request.

In the case of an AHB interface 80 connected to a single bus master, a particular priority value can be allocated to access requests received from that AHB interface 80. However, in the case of an AHB interface 80 which may be connected to multiple bus masters, different priority values can be allocated to access requests received from the different bus masters.

For example, depending on the bus master, it may be acceptable for access requests to suffer a higher latency, or it may be necessary for access requests to be handled with a lower latency.

Each of the AHB interfaces 80, in the case of interfaces connected to a single bus master, and each individual bus master, in the case of interfaces to which multiple bus masters may be connected, is therefore allocated a particular Quality of Service priority value. The Quality of Service priority value indicates a degree of latency, which the bus master may suffer, and also indicates an amount of bandwidth, which may be allocated to that bus master.

Figure 3:
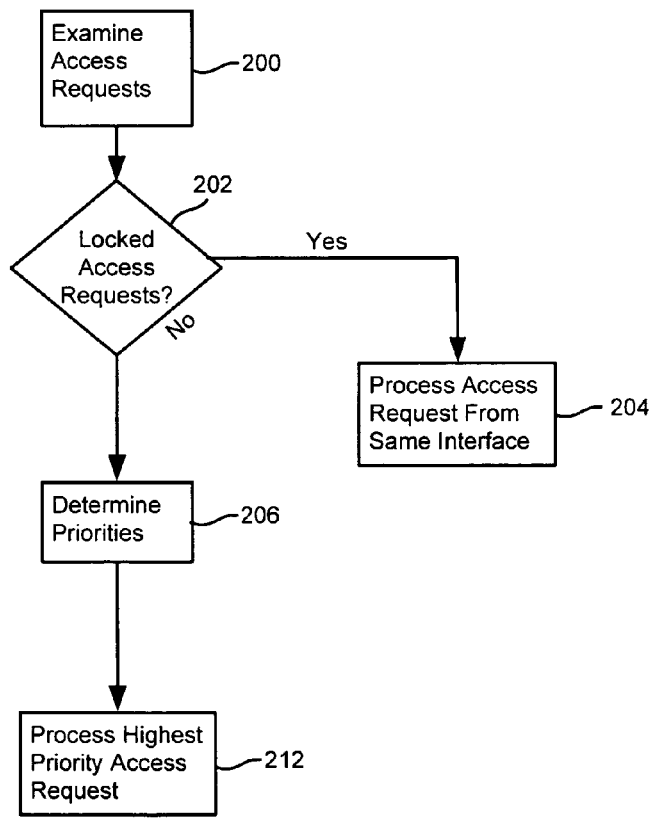
FIG. 3 is a flow chart illustrating a method in accordance with the present invention.

FIG. 3 is a flow chart, illustrating a method used by the Selection Matrix block 100 in prioritizing amongst received access requests.

In step 200, the Selection Matrix block 100 examines the access requests presented by the AHB interfaces 80. As mentioned above, each of the AHB interfaces 80 stores received access requests in a respective FIFO 88, and therefore presents the access requests in the order in which they are received.

In step 202, it is determined whether the access request most recently placed in the SDRAM Command Queue was a locked access request, that is, an access request forming part of an AHB transfer to a particular one of the interfaces 80 that comprises several SDRAM accesses. Locked accesses are often used in the case of Read-Modify-Write transfers to a memory location or register, which must be broken up. If so, the process passes to step 204. In step 204, the Selection Matrix block 100 passes to the SDRAM Command Queue the next access request from that same interface 80. This ensures that all of the SDRAM accesses forming part of such an AHB burst are handled consecutively.

If the request most recently placed in the SDRAM Command Queue was not a locked access request, the process passes to step 206. In step 206, for the access requests presented by each of the AHB interfaces 80, the Selection Matrix block 100 determines the priority values for the access requests.

The priority values for the access requests may be determined, for example, by examining any Quality of Service issues for each interface. The Quality of Service issues may relate to bandwidth and/or latency. Thus, a higher priority can be given to interfaces which have been guaranteed a particular bandwidth. Similarly, a latency threshold can be allocated to each interface. The latency threshold may correspond to a maximum delay to which relevant access requests should be subjected. By Counting down from the allocated latency threshold, for example once per clock cycle of the SDRAM controller, it is possible to determine which access requests are closer to expiry of the maximum delay, and should therefore be given a higher priority.

Also in step 206, the Selection Matrix block 100 examines the presented access requests and allocates efficiency priority values to them. That is, as described above, higher efficiency priority values are allocated to (a) access requests which are of the same type as the access request most recently placed in the queue, such as a read access (or a write access) following another read access (or write access) from (or to) the same physical bank; (b) access requests which relate to an open page in the SDRAM; (c) access requests which relate to a page in the SDRAM which is closed, but which can be opened in the background (d) access requests that are part of an AHB burst comprising several SDRAM accesses; and (e) access requests that will not involve a read-modify-write cycle, requiring error correction.

In addition, in the case of an interface to which multiple bus masters can be connected, a higher efficiency priority value can be given to access requests from some bus masters than to access requests from other bus masters. In order to achieve this, the Selection Matrix block examines the information identifying the device making the request, that is, the bus master number.

The bus master priority values and the efficiency priority values are combined to form overall priority values for each of the presented access requests. This combination can be performed in any convenient way, and is preferably user configurable, depending on the importance to be given to the bus master priority values and the efficiency priority values. For example, the two priority values can simply be added together to form the overall priority values, or different weightings can be given to the two priority values, or to different components of the two priority values.

In step 212, it is then determined which of the access requests has the highest overall priority value, and this access request is placed next in the SDRAM Command Queue. In the event that two or more access requests have equal overall priority values, some other criterion can be used to determine which access request should be placed next in the SDRAM Command Queue. For example, a simple round robin prioritisation can be used.

In accordance with the invention, therefore the SDRAM controller can therefore ensure that access requests from each bus master, in particular from bus masters which share an interface to the SDRAM controller, are given an appropriate degree of priority.

The invention has been described herein with reference to one particular embodiment, in particular in which the memory controller is integrated in the ASIC part of a reconfigurable device including an embedded processor.

However, other embodiments of the invention are also possible, for example in which the memory controller forms part of a different device, or is a separate integrated circuit. Thus, the invention is also applicable to a reconfigurable device, such as a programmable logic device (PLD) or field programmable gate array (FPGA), in which the memory controller is implemented in the programmable part of the device. Further, the invention is applicable to an application specific integrated circuit (ASIC), to which a further device, for example such as a programmable logic device (PLD) or field programmable gate array (FPGA), may be connected. In such cases, the programmable logic device (PLD) or field programmable gate array (FPGA) may or may not include an embedded processor.

Further, the invention is also applicable to other devices, in which the memory controller is connected to the available memory resources by specific data formats or protocols, not requiring the use of a dedicated memory bus.

The scope of the present invention is therefore to be determined only by the accompanying claims.

The invention claimed is:

1. A memory controller for accessing a memory, the memory controller comprising:
   at least one first input port connected with a first bus line, wherein multiple bus masters are each connected with the first bus line;
   an arbiter, for forming a queue of memory access requests from memory access requests received on the at least one first input port,
   wherein the arbiter receives a bus master identifier and an address of the memory included in each memory access request received on the at least one first input port, the bus master identifier indicating which of the multiple bus masters each said memory access request originates, and wherein the arbiter prioritizes memory access requests among the multiple bus masters within said queue based on a priority level of the associated bus master identifiers and based on the addresses received in the memory access requests,
   wherein the arbiter gives a higher priority to memory access requests which relate to a page in the SDRAM which is closed, but which can be opened as a background process, than a priority given to a portion of other memory access requests of the same type, wherein read access requests are of a first type and write access requests are of a second type.

2. A memory controller as claimed in claim 1 further comprising:
   at least one second input port, to which a single bus master may be connected, wherein the arbiter prioritizes memory access requests within said queue, based on the input port from which each said memory access request originates.

3. A memory controller as claimed in claim 1, wherein each first input port is a bus interface.

4. A memory controller as claimed in claim 3, wherein each bus interface is an AHB bus interface.

5. A memory controller as claimed in claim 1, wherein each second input port is a bus interface.

6. A memory controller as claimed in claim 5, wherein each bus interface is an AHB bus interface.

7. A memory controller as claimed in claim 1, further comprising an interface for connection to a SDRAM memory device.

8. A memory controller as claimed in claim 1, wherein the arbiter gives a higher priority than normal to memory access requests which are of the same type as the access request most recently placed in the queue and which relate to a physical bank to which the access request most recently placed in the queue related, wherein read access requests are of a first type and write access requests are of a second type.

9. A memory controller as claimed in claim 1, wherein the arbiter gives a higher priority to memory access requests which relate to an open page in the SDRAM than a priority given to a portion of other memory access requests of the same type, wherein read access requests are of a first type and write access requests are of a second type.

10. A memory controller, comprising:
   a plurality of bus interfaces wherein at least one of said plurality of bus interfaces connects to a plurality of bus master devices;
   a memory interface for connection to a memory device; and
   an arbiter for prioritizing memory access requests received from said bus interfaces,
   wherein for memory access requests received from said bus interface that connects to a plurality of bus master devices, the arbiter prioritizes the memory access requests based on a priority level of the memory access requests and a priority level of an identity of the bus master device originating the memory access request, wherein the arbiter gives a higher priority to memory access requests which relate to a page in the SDRAM which is closed, but which can be opened as a background process, than a priority given to a portion of other memory access requests of the same type, wherein read access requests are of a first type and write access requests are of a second type.

11. A memory controller as claimed in claim 10, wherein each of the bus interfaces is adapted to present a respective memory access request, and the arbiter is adapted to select one of the presented memory access requests, and to place the selected memory access request in a queue of memory access requests.

12. A memory controller as claimed in claim 11, wherein the memory interface is adapted to pass the selected memory access requests from the queue of memory access requests to the memory device in turn.

13. A memory controller as claimed in claim 10, wherein the memory device is a SDRAM device.

14. In a memory controller having a plurality of bus interfaces, wherein at least one of said plurality of bus interfaces connects to a plurality of bus master devices; having a memory interface for connection to a memory device; and having an arbiter for prioritizing memory access requests received from said bus interfaces, a method for controlling memory accesses to the memory device, the method comprising:
   for memory access requests received from said bus interface that connects to a plurality of bus master devices:
   determining, for each memory access request, an identity of the bus master making that memory access request using a bus master identifier that is included in that memory access request;
   prioritizing, using the arbiter in the memory controller, a sending of the memory access requests from the memory controller to the memory device, wherein the prioritizing is based on a priority level of the memory access requests and a priority level based on an identity of the bus master device originating the memory access request; and
   associating a higher priority with memory access requests which relate to an open page in the SDRAM than a priority associated with a portion of other memory access requests of the same type, wherein read access requests are of a first type and write access requests are of a second type, and
   wherein the arbiter gives a higher priority to memory access requests which relate to a page in the SDRAM which is closed, but which can be opened as a background process, than a priority given to a portion of other memory access requests of the same type.

15. A method as claimed in claim 14, comprising selecting a memory access request, from a plurality of memory access requests presented by respective bus interfaces, and placing the selected memory access request in a queue of memory access requests.

16. A method as claimed in claim 15, comprising passing the selected memory access requests from the queue of memory access requests to the memory device in turn.

* * * * *